Figures 1, 2:
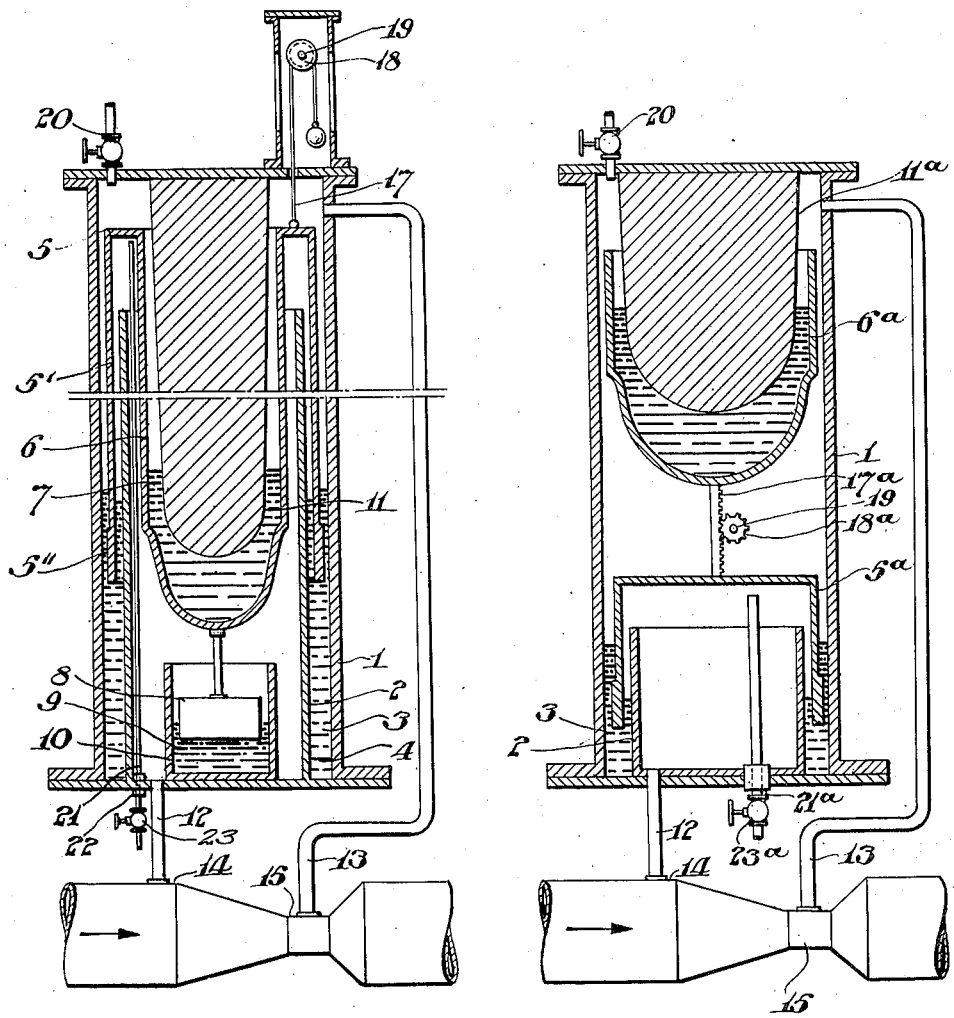

Oct. 4, 1932. J. W. LEDOUX 1,880,206
METER
Filed Dec. 22, 1928

Inventor:
John W. Ledoux,
By [signature]
Attorney.

Patented Oct. 4, 1932

1,880,206

UNITED STATES PATENT OFFICE

JOHN W. LEDOUX, OF SWARTHMORE, PENNSYLVANIA

METER

Application filed December 22, 1928. Serial No. 327,848.

My invention is a simplified apparatus for controlling movements of mechanism resulting from, and normally directly proportional to, changes in head or differential pressure so as to secure movements of such mechanism directly proportional to changes in velocity or volume which bear an exponential functional relationship to changes in such head or differential pressure. By my improvements, more accurate measurements are attainable by the use of a liquid seal eliminating the friction and other mechanical impediments to the positioning of the mechanism so as to correctly reflect the condition of flow or movement of the fluid being measured and by interposing variable resistances to the movements of the mechanism by the immersion of a fixed device of mathematically computable form in a liquid pool independently of and unaffected by movements of the liquid seal. The displacement of fluid by the displacing device and consequently the resistances to movement of the mechanism are proportioned to the functional relationship between the head or differential pressure and the velocity or volume of flow in a conduit or channel or through an orifice of particular type.

My improvements are applicable to the measurement of either liquids or gases and differential pressures may be obtained from the flow thereof through a conduit by means of a Venturi tube, Pitot tubes, an orifice plate or other pressure differentiating mechanism. In accordance with my improvements, such differential pressures are communicated to opposite sides of an inverted hollow member, such as a hood or bell, sealed and preferably supported by a fluid seal heavier than that to be measured and contained in a suitable casing.

The hood supports a container for a pool of liquid heavier than that to be measured and such heavy liquid is displaced by immersion therein by the rise of the hood of a fixed displacing device so tapered from its base toward the plane of the liquid in the datum or "no flow" position so as to interpose variable resistances to the movements of the hood proportional to the relationship between the volume or velocity of flow in the conduit and the differential pressures resulting therefrom.

The movements of the hood thus directly proportioned to the volume or velocity of the fluid being measured may be transmitted to usual forms of indicating, registering and recording instruments such, for instance, as are illustrated in my Patents Nos. 1,064,748 and 1,129,209.

The characteristic features and advantages of my improvements will more fully appear from the following description and the accompanying drawing of illustrative embodiments of my invention:

In the drawing, Fig. 1 is a diagrammatic vertical sectional view of a form of apparatus embodying my invention; and Fig. 2 is a diagrammatic vertical sectional view of a modified form thereof.

As illustrated in Fig. 1, a closed cylindrical casing 1 contains a partition 2 forming a channel 3 containing a liquid, as mercury 4, heavier than that to be measured. A hood or bell 5 has its flange or skirt 5' depending into the channel 3 and sealed and preferably supported by the mercury 4. The lower edge 5" of the flange 5' may be thickened, if necessary, to provide increased buoyancy. The top of the hood is depressed or recessed to form a cup or container 6 for a pool of liquid, as mercury 7, heavier than that to be measured. The bottom of the cup may have fixed thereto additional or alternate supporting means such as a float 8 supported by mercury 9 in the pot 10. The buoyancy of the float 8 and thickened lower edge 5" of the flange 5', or either of them, support the weight of the hood and the mercury contained therein so that the surface of the mercury 7 is normally positioned in the plane of and tangent to the bottom of the fixed displacing device 11 depending from the top of the casing 1.

The chambers formed in the casing 1 within and without the hood communicate through the pipes 12 and 13 with zones of different pressures, such as are caused by the flow of a fluid to be measured through a conduit containing a Venturi tube or other pressure differentiating means. The pipe 12 is connected with a normal section 14 of the conduit and the pipe 13 is connected with the contracted throat 15.

When there is no flow in the conduit, the pressures communicated to the chambers of the casing 1 through the pipes 12 and 13 are equal and the movable mechanism within the casing stands with the surface of the mercury 7 just touching the lower surface of the displacing device. As the flow in the conduit increases from zero to the maximum, the pressure communicated through the pipe 13 decreases much more rapidly than that communicated through the pipe 12; and the velocity or volume of the flowing fluid is approximately proportional to the square root of the difference in pressures.

The difference in pressures in the chambers causes the pool of mercury 7 to be lifted so as to immerse the displacing device 11 which is exteriorly so shaped as to interpose a varying resistance to the rise of the hood so that the movement of the hood instead of being proportional to the differential pressure is directly proportional to the velocity of the flowing fluid. The movements of the hood may be communicated to indicating, registering and recording mechanism through a counterweighted tension member 17, sheave 18 and shaft 19.

Air accumulating in the top of the casing 1 may be vented through suitable valve 20 and air accumulating in the top of the hood may be vented through the sliding tube 21 passing through a stuffing box 22 and controlled by a valve 23.

In order to simplify the construction and decrease the length of displacing device required for a given maximum flow without unduly increasing the diameter of the casing, the apparatus may be constructed as illustrated in Fig. 2 with the cup 6a supported above the hood 5a so that the hood 5a does not surround the displacing device and its diameter need be no greater and may be less than the diameter of the cup 6a. The displacing device is tapered from its base toward the surface of the fluid to be displaced, the contour being such as to interpose resistances to the movement of the hood and cup varying proportionately to the required exponential function of the differences in pressures requisite to cause movement of the hood and cup directly proportional to the velocity or volume. This movement may be transmitted to suitable indicating, registering and recording mechanism through the rack 17a, toothed sheave 18a and shaft 19, or in other suitable manner.

By suitably shaping the displacing device and proportioning the parts my improvements may be used for the measurement of either gases or liquids and the pool of mercury co-operating with the displacing device for controlling the movement of the mechanism is unaffected by the movements of the fluid sealing the hood.

Having described my invention, I claim:

1. Apparatus of the character described comprising a casing containing a liquid heavier than that to be measured, mechanism movable in said casing and comprising an inverted bell sealed by said liquid and a cup supported by said bell and containing liquid heavier than that to be measured, a device fixed to the casing and for displacing liquid contained in said cup, and means for communicating differential pressures to said casing within and without said bell.

2. Apparatus of the character described, comprising a casing having therein a channel containing a liquid heavier than that to be measured, a hood having a flange sealed by said liquid, a container carried by said hood and having a body of liquid therein, a fixed displacing device fixed relatively to said casing, said device and body of liquid being relatively movable, and means for communicating differential pressures to opposite sides of said hood.

3. Apparatus of the character described comprising a casing containing liquid heavier than that to be measured, a hood sealed and supported by said liquid, a cup carried by said hood and containing liquid heavier than the fluid to be measured, a tapered displacing device fixed relatively to said casing and depending into said last named liquid, and means for communicating differential pressures from a flowing stream to the opposite sides of said hood, said displacing device having a shape interposing variable resistance to the movement of said hood proportional to the functional relation between the differential pressures and the velocity of said stream.

4. Apparatus of the character described comprising an inverted bell, a hollow casing, a partition within said casing and forming therewith a narrow channel containing a liquid seal for said bell, a container supported by said bell and containing a liquid pool, a displacing device, said bell and displacing device being relatively movable and the liquid in said pool being variably displaced by said displacing device by relative movements thereof, and means for communicating differential pressures from a flowing stream to said bell.

5. Apparatus of the character described comprising an inverted bell, a casing, a partition within said casing and forming therewith a narrow channel containing a liquid seal for said bell, a container carried by said bell and containing a liquid pool, a displacing device, said bell and displacing device being relatively movable and the liquid in said pool being variably displaced by said displacing device by relative movements thereof, and means for communicating differential pressures from a flowing stream to said bell and including a tube communicating with said apparatus within the perimeter of said partition, the variations in the displacement of the liquid of said pool being proportioned to changes in the rate of flow of said flowing stream.

In testimony whereof I have hereunto set my name this 18th day of December 1928.

JOHN W. LEDOUX.